(12) United States Patent
Hill

(10) Patent No.: US 8,564,160 B2
(45) Date of Patent: Oct. 22, 2013

(54) LINEAR ACTUATING DRIVE, IN PARTICULAR FOR ADJUSTING THE FLAPS IN MOTOR VEHICLE TURBOCHARGERS

(75) Inventor: Wolfgang Hill, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 314 days.

(21) Appl. No.: 13/001,125

(22) PCT Filed: Jun. 16, 2009

(86) PCT No.: PCT/EP2009/057417
§ 371 (c)(1),
(2), (4) Date: Mar. 2, 2011

(87) PCT Pub. No.: WO2009/156297
PCT Pub. Date: Dec. 30, 2009

(65) Prior Publication Data
US 2011/0140549 A1    Jun. 16, 2011

(30) Foreign Application Priority Data
Jun. 24, 2008   (DE) .......................... 10 2008 030 016

(51) Int. Cl.
*H02K 41/03* (2006.01)
(52) U.S. Cl.
USPC ......................................... 310/12.18; 310/80
(58) Field of Classification Search
USPC ............................ 310/80, 12.08, 68 R, 20, 18
See application file for complete search history.

(56) References Cited

U.S. PATENT DOCUMENTS

| | | | |
|---|---|---|---|
| 6,531,798 B1 * | 3/2003 | Palmero | 310/112 |
| 7,268,449 B2 * | 9/2007 | Suzuki et al. | 310/12.26 |
| 7,325,637 B2 * | 2/2008 | Sadarangani | 180/65.31 |

FOREIGN PATENT DOCUMENTS

| | | |
|---|---|---|
| DE | 10 2005 040 290 A1 | 2/2007 |
| DE | 10 2005 055 868 A1 | 6/2007 |
| EP | 1 041 698 A2 | 10/2000 |
| EP | 1 126 582 A2 | 8/2001 |
| EP | 1 363 382 A1 | 11/2003 |
| WO | 03/003546 A1 | 1/2003 |

OTHER PUBLICATIONS

Translation for DE 2005055868 Mar. 2, 2013.*

* cited by examiner

*Primary Examiner* — Nguyen N Hanh
(74) *Attorney, Agent, or Firm* — Lucas & Mercanti, LLP

(57) ABSTRACT

A linear actuator, in particular for adjusting the flaps in motor vehicle turbochargers. The linear actuator has an adjusting element that can be linearly displaced by an electric motor. The electric motor is a two-phase transverse flux machine. A rotor is arranged between two opposite single-phase stators, and the rotor is connected in a rotationally fixed manner to a rotatable and linearly stationary rotational element that engages with the linearly movable adjusting element in order to cause a linear movement of the adjusting element when the rotational element is rotated.

21 Claims, 2 Drawing Sheets

LINEAR ACTUATING DRIVE, IN PARTICULAR FOR ADJUSTING THE FLAPS IN MOTOR VEHICLE TURBOCHARGERS

This application is a 371 of PCT/EP2009/057417 filed Jun. 16, 2009, which in turn claims the priority of DE 10 2008 030 016.0 filed Jun. 24, 2008, the priority of both applications is hereby claimed and both applications are incorporated by reference herein.

The invention relates to a linear actuating drive, in particular for adjusting the flaps in motor vehicle turbochargers, having an actuating element, preferably a spindle shaft, which can be moved linearly by an electric motor.

Turbochargers serve to increase the power of internal combustion engines by pre-compressing the air flowing into the internal combustion engine. The pre-compression permits an increase in combustion chamber charges of the internal combustion engine for given combustion chamber volumes. Since the maximum power is restricted by the combustion chamber charge, the torque and power values that can be implemented increase with increasing combustion chamber charges. In turbochargers, the energy required for pre-compressing the air at the inlet side of the internal combustion engine is extracted from the internal and kinetic energy of the exhaust gas. The exhaust gas drives a turbine which, via a shaft, drives a compressor. The power that can be transmitted from the exhaust gas to the turbine is determined by the exhaust-gas mass flow and the enthalpy gradient across the turbine.

The charge pressure may be regulated inter alia by means of mechanically adjustable flaps. A larger or smaller exhaust-gas mass flow is conducted via the turbine depending on the flap position. The adjustment of the flaps has hitherto been implemented predominantly by means of pneumatic linear actuating drives, in which the required compressed air is branched off from the system itself. Even though pneumatic linear actuating drives are cheap and can be produced in high quantities, they are associated with some disadvantages. Firstly, it is not possible to precisely set the flap position. Substantially only the states "open" and "closed" can be provided reliably; intermediate positions can be implemented only in an imprecise manner and with low dynamics. Secondly, pneumatic linear actuating drives have the disadvantage that they require a complex pressure supply. Leaks in the pressure system can very quickly result in failure of the linear actuating drive.

In general, different embodiments of electromechanical linear actuating drives are known. For low levels of actuating power and when there is high cost pressure, use is often made of a worm gear mechanism composed of plastic in combination with mechanically commutated direct-current motors. Although electromechanical linear actuating drives with conventional self-locking gear stages, usually worm gear mechanisms, provide a high transmission ratio, they have a large efficiency distribution. A low nominal efficiency must be selected to ensure reliable self-locking. In the worst case, the electrical power of the electric motor and the electronics must be designed with a high safety factor, which is expensive. The linear movement required for adjusting the abovementioned flaps of a turbocharger cannot be generated by means of a worm gear mechanism alone. To implement this, it is necessary to provide a toothed rack or a lever arrangement, which requires additional installation space and entails additional costs, and increases the susceptibility of the actuating drive to wear.

Also known from the prior art are electromechanical linear actuating drives in which the electric motor generates the linear force directly via a spindle nut. Such linear actuating drives are used in motor vehicles for example to adjust headlamps or air flaps. Said linear actuating drives generally have a spindle nut composed of plastic and claw pole stepper motors. Linear actuating drives having a plastic spindle nut and claw pole stepper motors are used only in low-power applications with low dynamics. This is firstly because of the low efficiency and high wear of the plastic spindle nut and secondly also because of the low efficiency of the claw pole stepper motor. On account of high leakage flux between the claws, efficiencies of only approximately 30% are attained. Cooling problems prevent economical use of claw pole motors with higher levels of power.

DE 10 2005 055 868 A1 describes a linear actuating motor with a threaded drive, in which the threaded nut is formed by a metallic disk.

DE 10 2005 040 290 A1 discloses a drive for adjusting flaps for the supply of air in motor vehicles. A step-down gearing is arranged with the drive motor in a housing. The rotor of the drive motor engages around the stator pack in the form of a bell.

EP 1 126 582 A2 discloses a linear actuating drive having a linear plunger which can be moved by an electric actuating drive. The electric actuating drive is an electronically commutated electric motor whose rotor concentrically surrounds the linear plunger. The rotor may have a spindle nut with a thread for moving the linear plunger. In this embodiment, a plurality of magnet rings, or one multiply polarized magnet ring, may be arranged on the rotor concentrically from the outside. The linear actuating drive may be used in variable turbochargers for internal combustion engines to adjust the blades of the turbocharger.

It is therefore the object of the present invention, taking EP 1 126 582 A2 as a starting point, to provide an improved linear actuating drive, in particular for adjusting the flaps in motor vehicle turbochargers, which is characterized by high dynamics, small dimensions and low production costs.

The object according to the invention is achieved by means of a linear actuating drive according to the appended claim 1.

The linear actuating drive according to the invention is characterized in that the electric motor which serves to move the spindle shaft is a two-phase transverse flux machine the rotor of which is arranged between two single-phase stators situated axially opposite one another and is connected to a rotary element which is in engagement with the spindle shaft and the rotation of which is converted into the linear movement of the spindle shaft.

It has proven to be particularly expedient for the rotor to comprise a spindle nut or wobble sleeve which is in engagement with the spindle shaft. Here, the magnetically active parts of the rotor are arranged directly on axially opposite sides of the spindle nut or wobble sleeve. A further advantage of the solution according to the invention is that the spindle nut or wobble sleeve is driven by a so-called intermediate rotor which is arranged in the center of a symmetrical electric motor. Short force paths are generated in this way. The rotating mass is very low. The low inertia of the moving parts resulting from the low mass ensures short acceleration times, as a result of which the linear motor according to the invention is predestined as an actuating drive for the flaps of a turbocharger.

In one advantageous embodiment, the electric motor is designed as a two-phase transverse flux reluctance machine. The use of reluctance machines is advantageous because, with these, it is possible to dispense with expensive separate rotor position sensors. Instead, in reluctance machines, the already existing coil is used as a sensor coil, and the magnetic circuit is used as an angle-dependent inductivity. It is therefore possible without additional components to implement an analog angle measurement with a resolution that can be determined by the control electronics of the motor. Production costs can be saved in this way.

It is advantageous if the two stators have structurally identical stator cores. Here, the magnetic working air gaps are arranged radially one above the other. In relation to conventional can-type motors of claw pole design, the leakage flux is considerably reduced by means of this arrangement, as a result of which a significantly higher efficiency can be attained. In addition, the air gap forces acting on the rotor are substantially compensated, and loading of bearings or of the spindle nut or wobble sleeve by magnetic forces is restricted substantially to the desired tangential torques.

In one expedient embodiment, the stator cores are composed of annular plates of U-shaped cross section, with the legs thereof having a radially inner and a radially outer crown ring with axially projecting teeth. The radially inner crown ring and the radially outer crown ring have the same number of teeth, said number corresponding to the number of pole pairs of the linear actuating drive. It is advantageous to use a small number of thick electrical sheets, which are produced as punched, bent parts and are nested one inside the other, for the stator cores.

In a further advantageous embodiment, the stators have in each case one stator coil designed as an annular coil. The use of aluminum strip coils has proven to be particularly expedient. Aluminum strip coils are significantly cheaper than copper wire coils. Copper wire coils may self-evidently also be used. Aluminum strip coils compensate the disadvantage of the lower conductivity of aluminum largely by means of a higher fill factor. The aluminum strip coils have two oppositely wound winding halves. One winding half conducts the current radially inward, where said current passes into the second coil half in a cutout of the inner crown ring and flows radially outward again in said second coil half in the same rotational direction.

In one expedient embodiment, the rotor is composed of a small number of doubly toothed annular plates. This rotor design is particularly cheap. The annular plates may be produced by punching and, if appropriate, packetizing.

For adjustment counter to a load torque, the teeth either in the rotor or in the stator are formed so as to be wider than the groove, and have, toward a tangential end, a ramp which continuously increases the air gap. That direction in which the ramp reduces the air gap is the preferential direction and, in the preferential direction, the phases can be supplied with current >180° el, as a result of which an adjustment counter to a load is possible from any position. During an adjustment counter to the preferential direction, the load torque then provides assistance, and to start, the actuating system is firstly rotated out of a preferential position in the preferential direction by less than one step (for example 150° el), and then the second phase is supplied with full current early. As a result of the incomplete step, a direction reversal takes place and the actuating member accelerates, with assistance from the load torque, counter to the preferential direction. In the case of a mechanical efficiency of the wobble nut close to 50%, the impetus of the low rotor mass is sufficient to overcome the force-free angle range, and to reliably adjust even counter to the preferential direction despite a current supply duration of <180° el.

A reliable adjustment even with mechanical efficiencies considerably below 50% and a higher power density can be obtained with a rotor design with permanent magnet rings. In this case, it is a permanently excited transverse flux machine that is used. Here, it is preferable for two permanent magnet rings with alternately radially magnetizable sectors on axially opposite sides of the spindle nut or wobble sleeve to be used. This rotor design is however associated with higher costs.

In a particularly preferred embodiment of the invention, the rotor has an asymmetrical design in the axial direction. The first stator assigned to the first phase of the two-phase transverse flux machine is permanently excited by virtue of permanent magnet rings being arranged on one side of the rotor in the manner described above. The second stator is assigned the toothed rotor part on the other side of the rotor. In this embodiment, the transverse flux machine operates as a permanently excited transverse flux motor in the first phase and as a reluctance machine in the second phase. A particular advantage of this embodiment is an improved start-up behavior of the machine. The permanently excited phase can utilize magnetic attracting and repelling forces and can contribute significantly to torque production up to small angle ranges close to pole overlap. The reluctance phase contributes to torque production precisely in this torque-weak angle range. The torque production may be optimized by means of a correspondingly higher number of teeth on the reluctance side of the rotor and by means of an apt supply of current to the stator in both directions.

In relation to the permanently excited variant, a relatively high torque can be obtained at lower cost. In the second phase (auxiliary phase), the costs for the permanent magnets are saved. At the same time, said phase can be used in a highly effective manner as an angle sensor for the electronic commutation, and as a result, the sensors that would otherwise be required can be dispensed with. This hybrid design combines the advantage of permanent excitation (high torque) with that of the reluctance machine (cheap) and also improves the start-up behavior of the drive.

In a further advantageous embodiment, the rotor is connected to the spindle nut or wobble sleeve via bearing plates. The bearing plates may be composed of high-grade steel or plastic. The rotor plate rings may be cast directly into the plastic bearing plates. Regardless of whether high-grade steel or plastic is used for the bearing plates, the rotating parts of the linear actuating drive are relatively small and can be produced cheaply. On account of the low inertia, highly dynamic operation can be attained with low torques.

On account of the compact design of the rotor, it is possible for the rotor to be mounted using only one central bearing. Here, the bearing is arranged directly between the rotor plate rings. Since only one bearing is required, it is possible to obtain a significant reduction in costs in relation to conventional solutions in which generally two bearings are used.

It is also advantageous for the linear actuating drive to have stator sleeves for the axial guidance of the spindle shaft. The stator sleeves are produced preferably as injection molded parts from a temperature-resistant plastic with good sliding properties. The stator sleeves fill out the cutouts in the inner crown rings of the stator cores and may also be injection-molded directly onto said crown rings. Aside from the guidance function for the spindle shaft, the stator sleeves stabilize and fix the stator cores.

Further advantages, details and refinements of the present invention emerge from the following description of preferred embodiments with reference to the drawing, in which.

Figure 1:
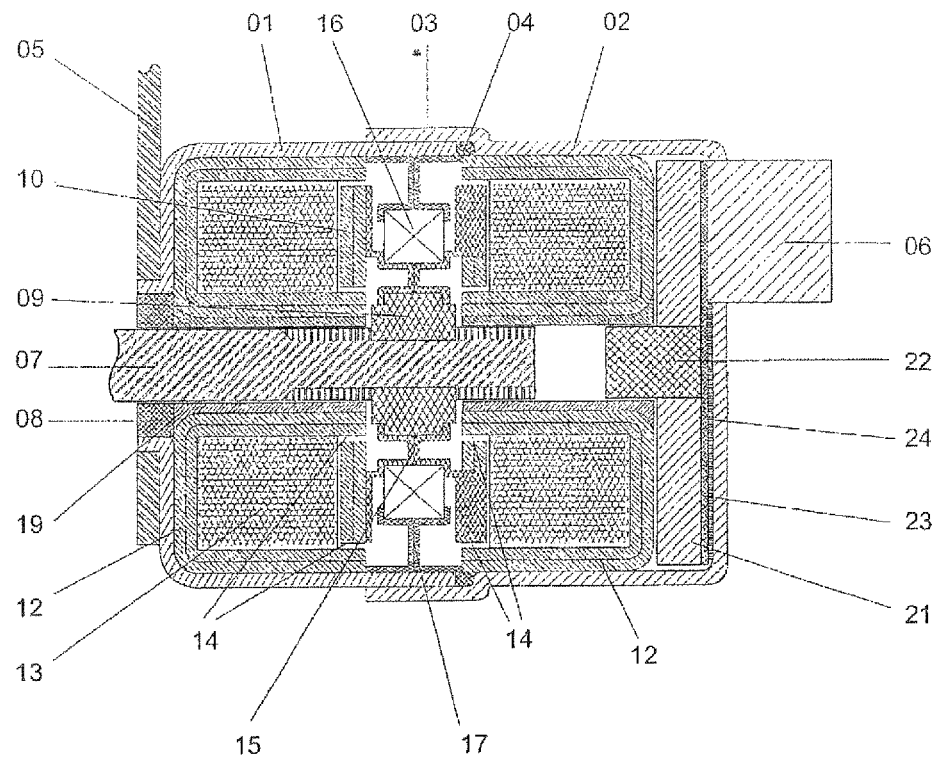
FIG. 1 shows a first embodiment of a linear actuating drive according to the invention in a longitudinal sectional illustration.

FIG. 1 shows a first embodiment of a linear actuating drive according to the invention in a longitudinal sectional illustration. The linear actuating drive according to the invention comprises a pot-shaped housing which is composed of a first and a second housing pot 01, 02. The second housing pot 02 has, at its open end, a flared portion 03 within which the open end of the first housing pot 01 is arranged. An O-ring 04 arranged on the first housing pot 01 serves to provide sealing. The first housing pot 01 has a bracket 05 for fastening to a connecting structure. A plug 06 for the supply of energy and for signal transmission is arranged on the second housing pot 02. In modified embodiments, the two housing pots may be connected to one another in some other way. The position of the plug is likewise variable.

Arranged within the housing is a spindle shaft 07, one end of which projects out of the first housing pot 01. Said spindle shaft end may be connected to the element to be driven (not illustrated), for example a flap of a motor vehicle turbocharger. A shaft seal 08 serves to seal the spindle shaft 07. Arranged concentrically around the spindle shaft 07 is a spindle nut 09. A threaded section of the spindle shaft 07 engages into a corresponding counterpart thread of the spindle nut 09. The spindle nut 09 is composed of a sliding material.

An electric motor designed as a two-phase transverse flux reluctance machine serves to generate the rotational movement of the spindle nut 09, as a result of which the linear movement of the spindle shaft 07 is generated. The transverse flux reluctance machine comprises two single-phase stators situated opposite one another, and a single rotor 10 which is arranged between the two stators. The two stators have structurally identical stator cores 12. The stator cores 12 are composed of at least two annular plates which are nested one inside the other and are of U-shaped cross section, the legs of which have in each case two crown rings. The stators also comprise in each case one stator coil 13. The stator coils 13 are designed as annular coils. In the embodiment shown in FIG. 1, annular coils composed of round copper wire are used. The magnetic flux alternates substantially in the radial direction from the stator core 12 to the rotor 10 and from the rotor 10 back to the stator core 12, and in so doing utilizes two annular air gaps 14 of different diameters.

In the particularly cost-effective variant illustrated, the rotor 10 is composed of a small number of doubly toothed annular plates.

The rotor 10 may however also be formed with permanent magnets instead of the annular plates. A sensor arrangement must then be provided to detect the rotor position.

The two radial air gaps 14 of each stator are connected magnetically in series. In this way, changes in position of the rotor 10 in the U-shaped openings of the stator cores 12 have only a minor effect on the magnetic forces. This applies both in the axial direction and also in the radial direction. This relatively low sensitivity to air gap tolerances permits simple mounting and assembly of the linear actuating drive. The radial force components of the air gaps partially compensate one another. In this way, the rotor is substantially relieved of load, and bearing friction is reduced.

The spindle nut 09 is connected to the rotor 10 via rotating bearing plates 15. The rotor 10 is mounted by means of a central bearing 16 which is connected to the first housing pot 01 via stationary bearing plates 17. In the illustrated embodiment, the bearing 16 is designed as a rolling bearing. The spindle shaft 07 is guided by means of stator sleeves 19 which simultaneously also stabilize and fix the stator cores 12.

It is additionally or alternatively possible for a sliding block to be arranged on the end of the spindle shaft 07 and for a sliding sleeve to be arranged on the spindle shaft at the drive output side in front of the thread. By means of said sliding elements (not illustrated), precise linear guidance of the spindle shaft 07 is obtained without it being possible for the thread to damage the stator sleeves 19.

The stator coils 13 are actuated by means of control electronics 21. The control electronics 21 are arranged preferably on the base of the second housing pot 02. A circular disk is available as installation space for this purpose. The structural height of the control electronics 21 in the axial direction should be minimal. The control electronics 21 comprise a cylindrical capacitor 22 which is arranged in the second housing pot 02 in a region of the stator sleeve 19 which is not occupied by the spindle shaft 07. All the other electronic components are arranged and encapsulated preferably on one side of a circuit carrier 23. Via its rear side, the circuit carrier 23 dissipates the lost heat via a heat-conducting foil 24 to the base of the second housing pot 02, such that a good cooling action is obtained. The plug 06 projects axially or radially out of the second housing pot 02 at the edge of the base of the second housing pot 02. The terminals of the stator coils 13 are arranged radially at the outside in order that they can be guided axially through the bearing support to the control electronics 21. The two terminals of the stator coil 13 situated in the region of the first housing pot 01 can be connected to the circuit carrier 23 through an opening in the second housing pot 02 before the fixing of the plug 06. By means of test pulses, the control electronics 21 detect the angle-dependent change in inductivity of the stator coils 13, and from this determines the rotor position. It is therefore possible to dispense with the rotor position sensors otherwise used for this purpose, which not only facilitates assembly but not least also leads to cost savings.

The integration of the control electronics 21 into the housing contributes to a reduction in the system costs.

By means of corresponding actuation of the stators, the spindle nut 09 rotates such that the spindle shaft 07 is deployed out of the housing or retracted into the housing. Here, the setpoint position is transmitted via the plug 06 to the control electronics 21, which convert said signal into actuation signals for the stators.

Figure 2:
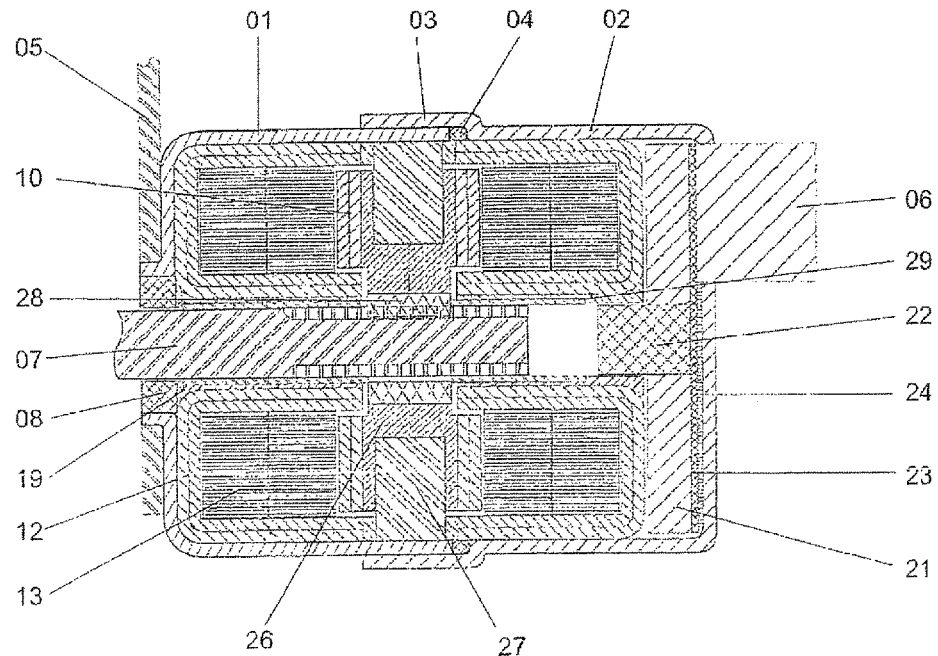
FIG. 2 shows a second embodiment of the linear actuating drive according to the invention in a longitudinal sectional illustration.

FIG. 2 shows a second embodiment of the linear actuating drive according to the invention in a longitudinal sectional illustration. Said embodiment differs from the embodiment described in FIG. 1 substantially in that annular coils composed of aluminum strip are used for the stator coils 13. The aluminum strip is provided with an oxide layer as insulation. The aluminum strip coil is composed of two oppositely wound halves. Costs can be saved by using aluminum strip coils instead of copper wire coils. A further difference in relation to the first embodiment is that a plain bearing comprising rotating plain bearing parts 26 and a stationary bearing ring 27 is used as a bearing. Plain bearings are cheaper than rolling bearings. Further costs can thus be saved by using a plain bearing. Furthermore, a wobble sleeve 28 is used instead of the spindle nut. The wobble sleeve 28 has tangential channels on its inner lateral surface. In this case, to position the wobble sleeve 28, a guide sleeve 29 is provided which extends axially to the left and to the right of the wobble sleeve 28.

Figure 3:
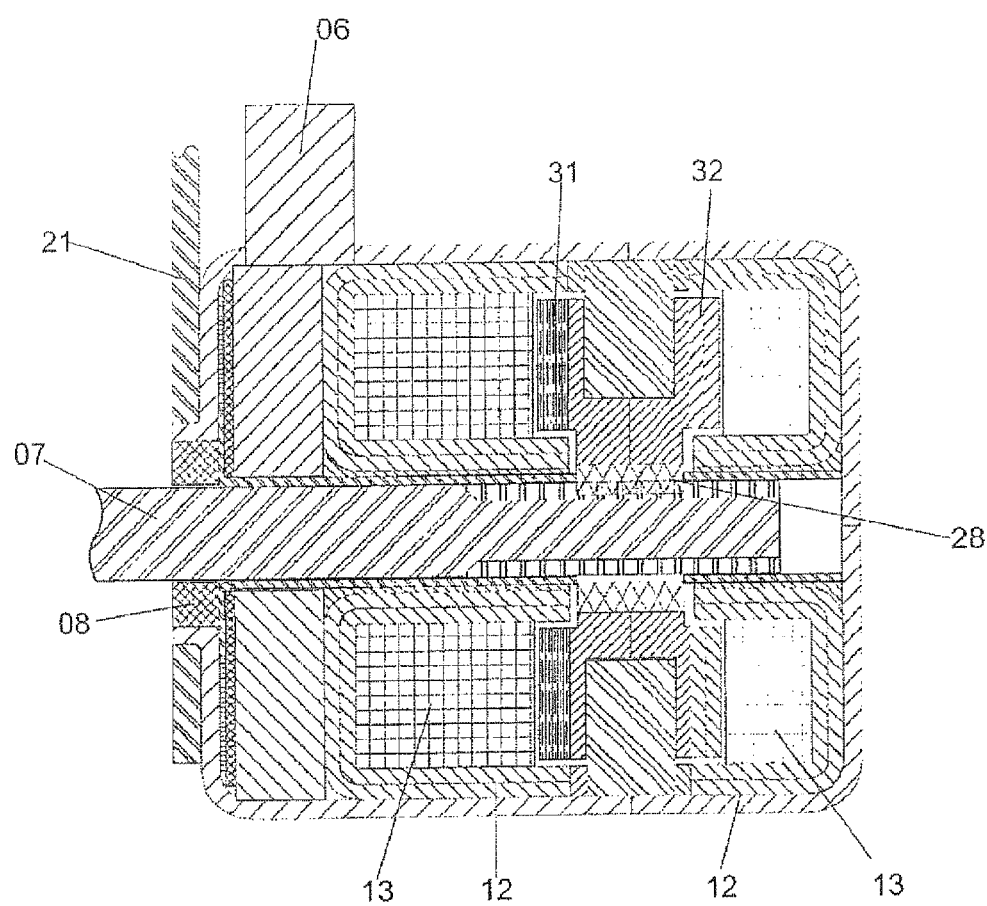
FIG. 3 shows a third embodiment of the linear actuating drive in a longitudinal sectional illustration.

FIG. 3 illustrates a third embodiment as a "hybrid" of permanent excitation and a reluctance motor. In this embodiment, the control electronics 21 and the plug 06 are arranged on the shaft side of the linear actuating drive. Stator cores 12, stator coils 13, rotating plain bearing parts 26 and wobble sleeve 28 may be designed as described above. This embodiment may self-evidently also be formed with a spindle nut and rolling bearing as in FIG. 1.

In this embodiment, the rotor is of asymmetrical design; it is formed with permanent magnets 31 on the left-hand side of the stator in the illustration, and with a rotor plate pack 32 on the right-hand side.

That phase of the two-phase transverse flux machine which is illustrated on the left thus operates with permanent excitation and provides the torque over approximately 60 to 80% of the period duration. During the commutation time, the torque production is assisted by the reluctance side (side illustrated on the right). The reluctance auxiliary torque acts over approximately 20 to 40% of the period duration. Furthermore, the reluctance side acts as an inductive angle sensor and generates the rotor position signal for the electronic commutation of the permanently excited half.

The stator coils 13 are dimensioned according to the actuation requirements of the respective side.

LIST OF REFERENCE NUMERALS

01 First housing pot
02 Second housing pot
03 Flared portion of the second housing pot
04 O-ring
05 Bracket
06 Plug
07 Spindle shaft
08 Shaft seal
09 Spindle nut
10 Rotor
11 -
12 Stator core
13 Stator coils
14 Air gap
15 Rotating bearing plates
16 Rolling bearing
17 Stationary bearing plates
18 -
19 Stator sleeves
20 -
21 Control electronics
22 Capacitor
23 Circuit carrier
24 Heat-conducting foil
25 -
26 Rotating plain bearing parts
27 Stationary bearing ring
28 Wobble sleeve
29 Guide sleeve
30 -
31 Permanent magnet
32 Rotor plate pack

The invention claimed is:

1. A linear actuating drive for adjusting flaps in motor vehicle turbochargers, comprising:
   an actuating element which can be moved linearly by an electric motor,
   wherein the electric motor is a two-phase transverse flux machine, with a rotor being arranged between two single-phase stators situated axially opposite one another, and in that the rotor is connected to a rotatably mounted and linearly stationary rotary element for conjoint rotation therewith, which rotary element is in engagement with the linearly movable actuating element in order to generate a linear movement of the actuating element when the rotary element rotates,
   wherein the stators have U-shaped stator cores that are composed of annular plates of U-shaped cross-section, wherein open ends of the U-shaped stator cores axially face one another.

2. The linear actuating drive as claimed in claim 1, wherein the linearly movable actuating element is a spindle shaft.

3. The linear actuating drive as claimed in dam 1, wherein the rotary element connected to the rotor is a spindle nut or a wobble sleeve.

4. The linear actuating drive as claimed in claim 1, wherein stator cores are structurally identical.

5. The linear actuating drive as claimed in claim 1, wherein the stators each have a stator coil designed as an annular coil.

6. The linear actuating drive as claimed in claim 5, wherein the stator coils are aluminum strip coils or copper wire coils.

7. The linear actuating drive as claimed in claim 1, wherein the electric motor is a two-phase transverse flux reluctance machine, with the rotor having distinct soft-magnetic poles.

8. The linear actuating drive as claimed in claim 7, wherein the rotor is composed of doubly toothed annular plates.

9. The linear actuating drive as claimed in claim 1, wherein the electric motor is permanently excited, with the rotor being provided with permanent magnets.

10. The linear actuating drive as claimed in claim 9, wherein the rotor comprises two permanent magnet rings with alternately radially magnetized sectors on axially opposite sides of the rotary element.

11. The linear actuating drive as claimed in claim 1, wherein a side, which is assigned to a first phase of the two-phase transverse flux machine, of the rotor is formed with permanent magnets, and in that a side, which is assigned to a second phase, of the rotor, is formed with distinct soft-magnetic poles.

12. The linear actuating drive as claimed in claim 1, wherein the rotor is connected to the rotary element via bearing plates.

13. The linear actuating drive as claimed in claim 1, further comprising a bearing for mounting the rotor.

14. The linear actuating drive as claimed in claim 13, wherein the bearing is a rolling bearing or a plain bearing.

15. The linear actuating drive as claimed in claim 1, further comprising stator sleeves for axial guidance of the spindle shaft.

16. The linear actuating drive as claimed in claim 1, wherein the rotary element is positioned symmetrically between the two opposite stators with respect to an axial direction of the rotor.

17. The linear actuating drive as claimed in claim 1, wherein control electronics are arranged in a housing of the electric motor and a cylindrical capacitor is arranged partially radially within a stator core.

18. The linear actuating drive as claimed in claim 1, wherein the rotor is arranged at least partially radially within the open ends of the stator cores.

19. A linear actuating drive for adjusting flaps in motor vehicle turbochargers, comprising:
   an actuating element which can be moved linearly by an electric motor,
   wherein the electric motor is a two-phase transverse flux machine, with a rotor being arranged between two single-phase stators situated axially opposite one another, and in that the rotor is connected to a rotatably mounted and linearly stationary rotary element for conjoint rotation therewith, which rotary element is in engagement with the linearly movable actuating element in order to generate a linear movement of the actuating element when the rotary element rotates, wherein the electric motor is permanently excited, with the rotor being provided with permanent magnets, and wherein the rotor comprises two permanent magnet rings with alternately radially magnetized sectors on axially opposite sides of the rotary element.

20. A linear actuating drive for adjusting flaps in motor vehicle turbochargers, comprising:

an actuating element which can be moved linearly by an electric motor, wherein the electric motor is a two-phase transverse flux machine, with a rotor being arranged between two single-phase stators situated axially opposite one another, and in that the rotor is connected to a rotatably mounted and linearly stationary rotary element for conjoint rotation therewith, which rotary element is in engagement with the linearly movable actuating element in order to generate a linear movement of the actuating element when the rotary element rotates, wherein a side, which is assigned to a first phase of the two-phase transverse flux machine, of the rotor is formed with permanent magnets, and in that a side, which is assigned to a second phas, of the rotor, is formed with distinct soft-magnetic poles.

21. A linear actuating drive for adjusting flaps in motor vehicle turbochargers, comprising:

an actuating element which can be moved linearly by an electric motor, wherein the electric motor is a two-phase transverse flux machine, with a rotor being arranged between two single-phase stators situated axially opposite one another, and in that the rotor is connected to a rotatably mounted and linearly stationary rotary element for conjoint rotation therewith, which rotary element is in engagement with the linearly movable actuating element in order to generate a linear movement of the actuating element when the rotary element rotates, wherein control electronics are arranged in a housing of the electric motor and a cylindrical capacitor is arranged partially radially within a stator core.

* * * * *

UNITED STATES PATENT AND TRADEMARK OFFICE
CERTIFICATE OF CORRECTION

PATENT NO. : 8,564,160 B2 Page 1 of 1
APPLICATION NO. : 13/001125
DATED : October 22, 2013
INVENTOR(S) : Wolfgang Hill It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 379 days.

Signed and Sealed this
Fifteenth Day of September, 2015

Michelle K. Lee
*Director of the United States Patent and Trademark Office*